US012255028B2

(12) United States Patent
Lin et al.

(10) Patent No.: US 12,255,028 B2
(45) Date of Patent: Mar. 18, 2025

(54) KEY STRUCTURE

(71) Applicant: Lite-On Technology Corporation, Taipei (TW)

(72) Inventors: Ko-Hsiang Lin, Taipei (TW); Chun-Lin Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 92 days.

(21) Appl. No.: 18/168,579

(22) Filed: Feb. 14, 2023

(65) Prior Publication Data

US 2023/0395336 A1 Dec. 7, 2023

Related U.S. Application Data

(60) Provisional application No. 63/348,022, filed on Jun. 2, 2022.

(30) Foreign Application Priority Data

Sep. 16, 2022 (CN) ......................... 202222454042.5

(51) Int. Cl.
*H01H 13/10* (2006.01)
*H01H 13/02* (2006.01)
(Continued)

(52) U.S. Cl.
CPC .......... *H01H 13/10* (2013.01); *H01H 13/023* (2013.01); *H01H 13/14* (2013.01);
(Continued)

(58) Field of Classification Search
CPC .. H01H 9/02; H01H 9/20; H01H 9/22; H01H 9/24; H01H 2003/32; H01H 2003/46; H01H 2013/00; H01H 2013/04; H01H 2013/50; H01H 2013/52; H01H 2215/00; H01H 2239/006; H01H 13/00; H01H 13/04; H01H 13/10; H01H 13/023; H01H 13/14; H01H 13/50; H01H 13/52; H01H 13/70;
(Continued)

(56) References Cited

U.S. PATENT DOCUMENTS 8,957,337 B2 * 2/2015 Niu ........................ H01H 3/125
200/344
9,634,661 B1 * 4/2017 Chen .................... H03K 17/969
(Continued)

*Primary Examiner* — Anthony R Jimenez
(74) *Attorney, Agent, or Firm* — JCIPRNET

(57) ABSTRACT

A key structure including a carrier, a keycap, a lifting member, and an elastic member is provided. The carrier includes a carrier body and multiple positioning hooks. The carrier body has multiple vias, and the positioning hooks are respectively disposed corresponding to the vias. Orthographic projection of each of the positioning hooks falls in the corresponding via. Each of the positioning hooks includes a first positioning portion and a second positioning portion respectively connected to two inner wall surfaces in the corresponding via. The keycap is disposed above the carrier body. The lifting member is disposed between the carrier body and the keycap. One end of the lifting member is connected to the keycap, and an other end of the lifting member is connected to the positioning hooks. The elastic member is disposed between the carrier body and the keycap.

8 Claims, 14 Drawing Sheets

100

(51) Int. Cl.
*H01H 13/14* (2006.01)
*H01H 13/52* (2006.01)

(52) U.S. Cl.
CPC ....... *H01H 13/52* (2013.01); *H01H 2219/062* (2013.01); *H01H 2225/03* (2013.01); *H01H 2239/022* (2013.01)

(58) Field of Classification Search
CPC ............... H01H 13/702; H01H 13/703; H01H 2219/062; H01H 2225/03; H01H 3/12; H01H 13/02
USPC ........................................................ 200/293
See application file for complete search history.

(56) References Cited

U.S. PATENT DOCUMENTS

2010/0128427 A1* 5/2010 Iso ........................ G06F 1/1616 200/310
2012/0048702 A1* 3/2012 Liu ........................ H01H 3/125 200/344

* cited by examiner

KEY STRUCTURE

CROSS-REFERENCE TO RELATED APPLICATION

This application claims the priority benefit of U.S. provisional application Ser. No. 63/348,022, filed on Jun. 2, 2022 and China application serial no. 202222454042.5, filed on Sep. 16, 2022. The entirety of each of the above-mentioned patent applications is hereby incorporated by reference herein and made a part of this specification.

BACKGROUND

Technical Field

This disclosure relates to a key structure, in particular to a key structure applied to a keyboard.

Description of Related Art

Keyboards are common physical input devices used to assist users in operating or inputting signals to a personal desktop, laptop or tablet computer, or other electronic products with keyboards or external keyboards.

Specifically, the keyboard is composed of multiple key structures, in each of which a lifting member is used to support the keycap and ensure that the keycap is raised and lowered in a specific direction relative to the carrier. The specific implementation of the lifting member may be scissor structure or butterfly structure, and has a first end connected to the keycap and a second end connected to the carrier. The second end of the lifting member is a positioning hook slidably or rotatably engaged with the carrier. In the process of repeated lifting and lowering, the positioning hook is pulled by the second end of the lifting member, and it is easy to break due to insufficient structural strength, resulting in the floating of the second end of the lifting member, which affects the reliability of the operation.

SUMMARY

The disclosure provides a key structure that helps to improve reliability of operation.

The key structure of the disclosure includes a carrier, a keycap, a lifting member, and an elastic member. The carrier includes a carrier body and multiple positioning hooks protruding from the carrier body. The carrier body has multiple vias, and the positioning hooks are respectively disposed corresponding to the vias. Orthographic projection of each of the positioning hooks falls in the corresponding via. Each of the positioning hooks includes a first positioning portion and a second positioning portion connected to the first positioning portion, and the first positioning portion and the second positioning portion of each of the positioning hooks are respectively connected to two inner wall surfaces connected to each other or two inner wall surfaces opposite to each other in the corresponding via. The keycap is disposed above the carrier body. The lifting member is disposed between the carrier body and the keycap. One end of the lifting member is connected to the keycap, and an other end of the lifting member is connected to the positioning hooks. The elastic member is disposed between the carrier body and the keycap.

According to an embodiment of the disclosure, the first positioning portion and the second positioning portion of each of the positioning hooks are respectively connected to the two inner wall surfaces connected to each other in the corresponding via. One of the inner wall surfaces of each of the vias is protruded with an extension support portion, and is connected to the first positioning portion or the second positioning portion of the corresponding positioning hook.

According to an embodiment of the disclosure, the key structure further includes a thin film circuit disposed on the carrier body, and located between the elastic member and the carrier body.

According to an embodiment of the disclosure, the thin film circuit has multiple through holes overlapping the vias, and the positioning hooks penetrate the through holes.

According to an embodiment of the disclosure, the key structure further includes a backlight module and the thin film circuit respectively disposed at two opposite sides of the carrier body. The thin film circuit has multiple through holes overlapping the vias.

According to an embodiment of the disclosure, the backlight module includes a circuit board, a light source, and a light guide plate. The light source and the light guide plate are disposed on the circuit board, the light guide plate has a recess for accommodating the light source. The light guide plate is located between the carrier body and the circuit board.

According to an embodiment of the disclosure, the backlight module includes a circuit board and multiple light sources. The light sources are disposed on the circuit board.

According to an embodiment of the disclosure, the key structure further includes an optical switch disposed on the thin film circuit. The keycap has a light blocking portion protruding toward the carrier body, and the optical switch is located on a moving path of the light blocking portion.

According to an embodiment of the disclosure, the other end of the lifting member contacts multiple bottom surfaces of the first positioning portions and multiple side surfaces of the second positioning portions of the positioning hooks.

According to an embodiment of the disclosure, the lifting member includes two lifting stands pivotally connected to each other. Each of the lifting stands has a first end and a second end opposite to the first end. The first end of each of the lifting stands is connected to the keycap, and the second end of each of the lifting stands is connected to two of the positioning hooks. The second end of each of the lifting stands contacts two of the bottom surfaces of two of the first positioning portions and two of the side surfaces of two of the second positioning portions of two of the positioning hooks.

According to an embodiment of the disclosure, the first positioning portion of each of the positioning hooks is partially protruding relative to the side surface of the second positioning portion to form a notch.

Based on the above, the key structure of the disclosure improves the structural strength of the positioning hooks and the strength of the connection between the positioning hooks and the carrier body to prevent the positioning hooks from breaking when they are pulled or to prevent the cracks between the positioning hooks and the carrier body when they are pulled, so as to improve the reliability of the operation.

To make the aforementioned more comprehensible, several accompanied with drawings are described in detail as follows.

BRIEF DESCRIPTION OF THE DRAWING

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
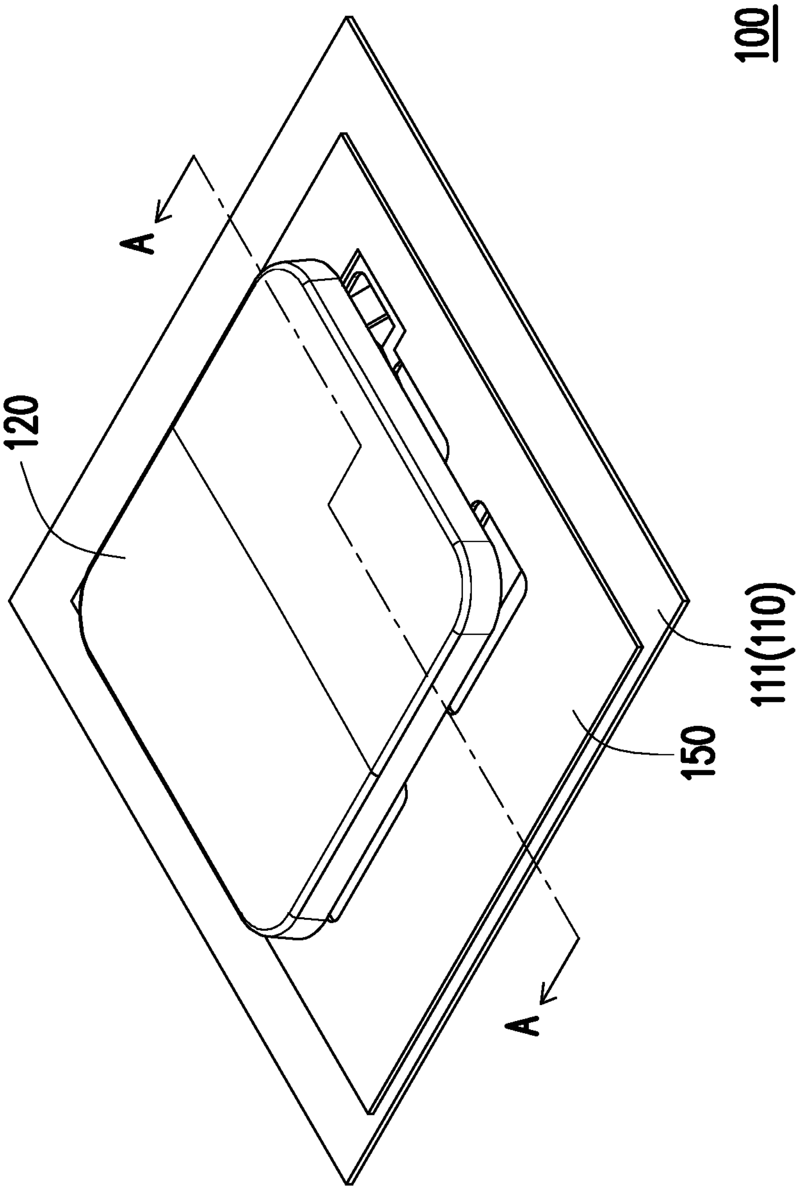
FIG. 1 is a schematic diagram of a key structure according to a first embodiment of the disclosure.
Figure 2A:
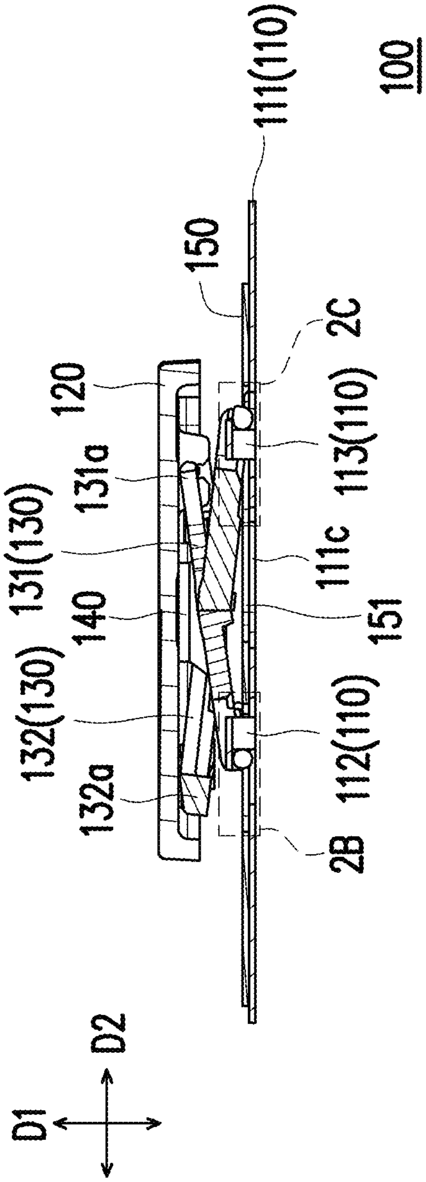
FIG. 2A is a schematic cross-sectional diagram of the key structure of FIG. 1 along a section line A-A.
Figure 2C:
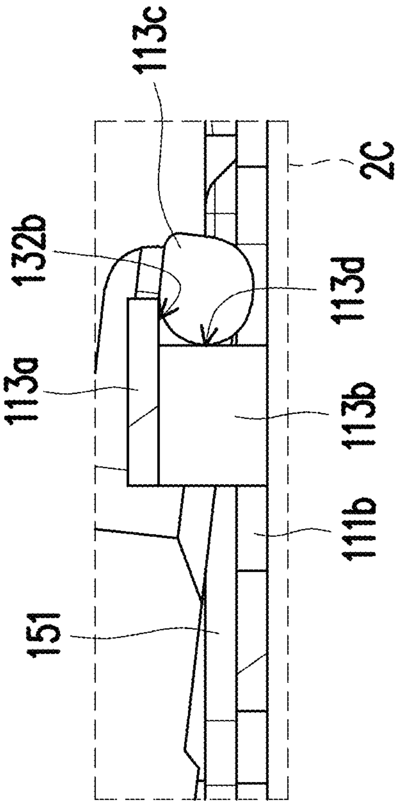
FIG. 2C is an enlarged schematic view of the area designated as 2C in FIG. 2A.
Figure 2B:
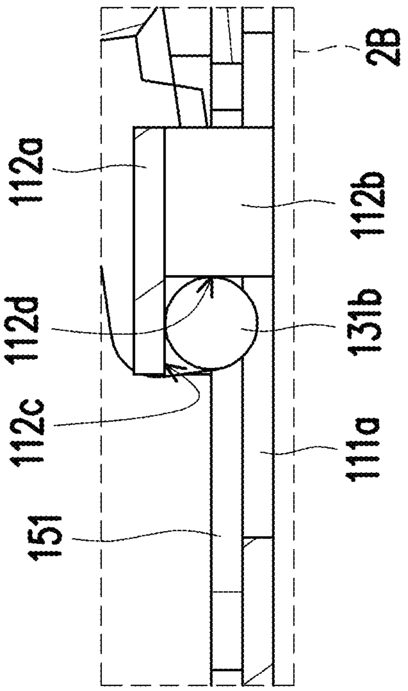
FIG. 2B is an enlarged schematic view of the area designated as 2B in FIG. 2A.

FIG. 1 is a schematic diagram of a key structure according to a first embodiment of the disclosure. FIG. 2A is a schematic cross-sectional diagram of the key structure of FIG. 1 along a section line A-A. FIG. 2B is an enlarged schematic view of the area designated as 2B in FIG. 2A. FIG. 2C is an enlarged schematic view of the area designated as 2C in FIG. 2A. Referring to FIG. 1 and FIG. 2A to FIG. 2C first, according to this embodiment, a key structure 100 includes a carrier 110, a keycap 120, a lifting member 130, and an elastic member 140. The keycap 120 is disposed above the carrier 110, and the lifting member 130 and the elastic member 140 are disposed between the keycap 120 and the carrier 110. The lifting member 130 and the elastic member 140 support the keycap 120 collectively. The lifting member 130 may be used to ensure that the keycap 120 is raised and lowered in a particular direction relative to the carrier 110, and the elastic member 140 may be used to maintain the height of the keycap 120 relative to the carrier 110 or to provide the required restoring force when the keycap 120 is lifted after being pressed. For example, the lifting member 130 may be a scissor structure, and the elastic member 140 may be a rubber dome or a metal dome.

The key structure 100 further includes a thin film circuit 150. The thin film circuit 150 is disposed on the carrier 110 and located between the elastic member 140 and the carrier 110. Specifically, top and bottom ends of the elastic member 140 contact the keycap 120 and the thin film circuit 150 respectively. When the keycap 120 is pressed and lowered (i.e., moved toward the carrier 110), the elastic member 140 is squeezed by the keycap 120 and deformed elastically, and the elastic member 140 is further squeezed to the thin film circuit 150, causing the circuit in the thin film circuit 150 to conduct to generate a trigger signal.

Figure 3A:
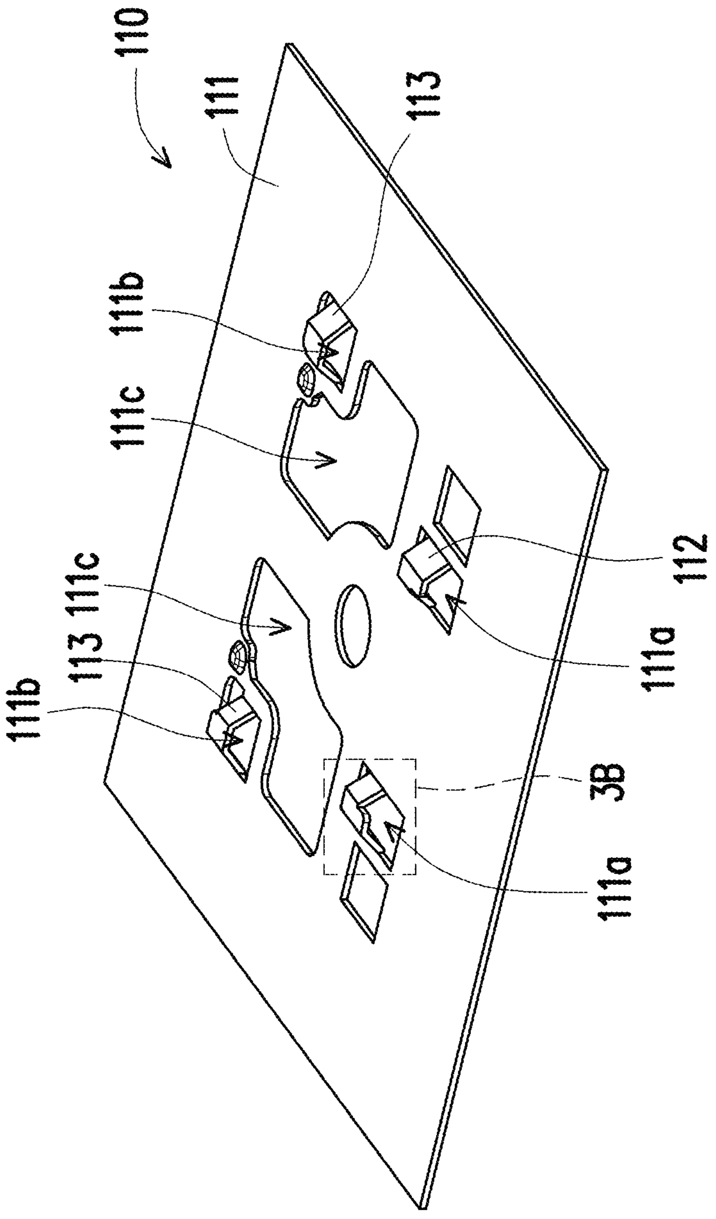
FIG. 3A is a schematic diagram of a carrier according to the first embodiment of the disclosure.
Figure 3B:
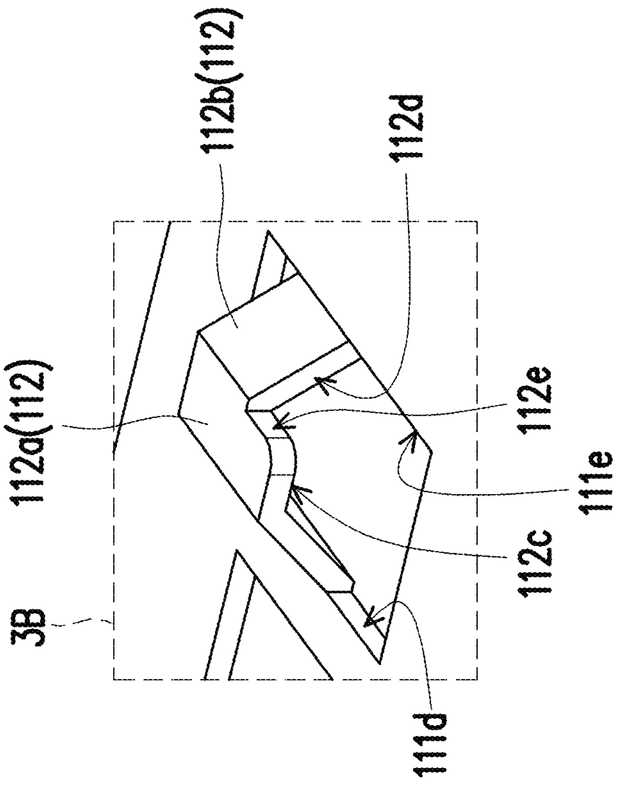
FIG. 3B is an enlarged schematic view of the area designated as 3B in FIG. 3A.
Figure 4A:
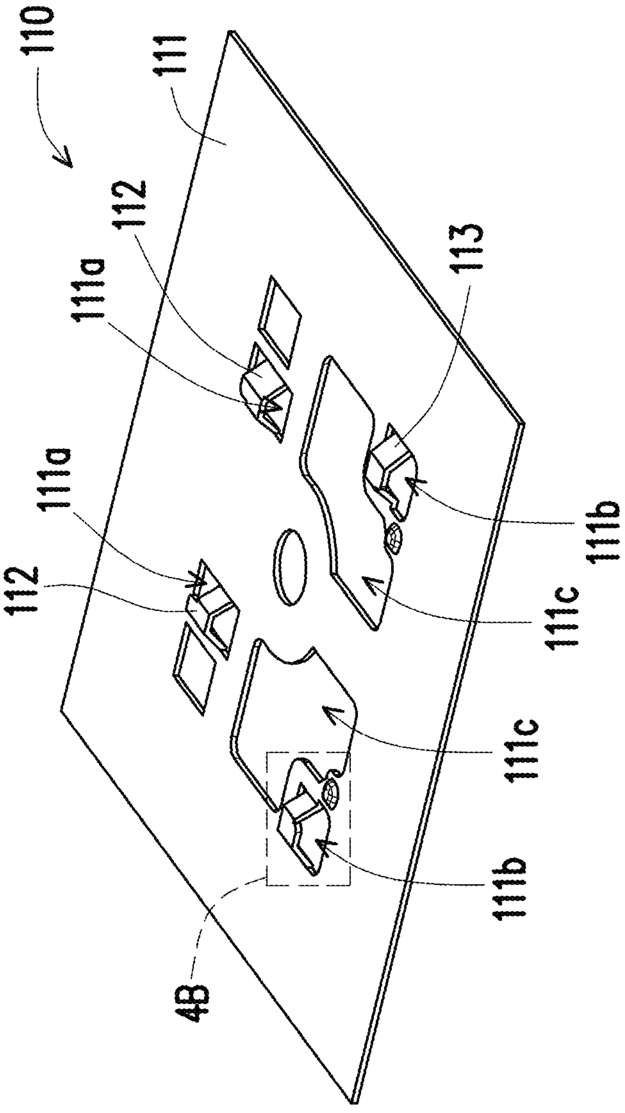
FIG. 4A is a schematic diagram that illustrates a different perspective of the view shown in 3A.
Figure 4B:
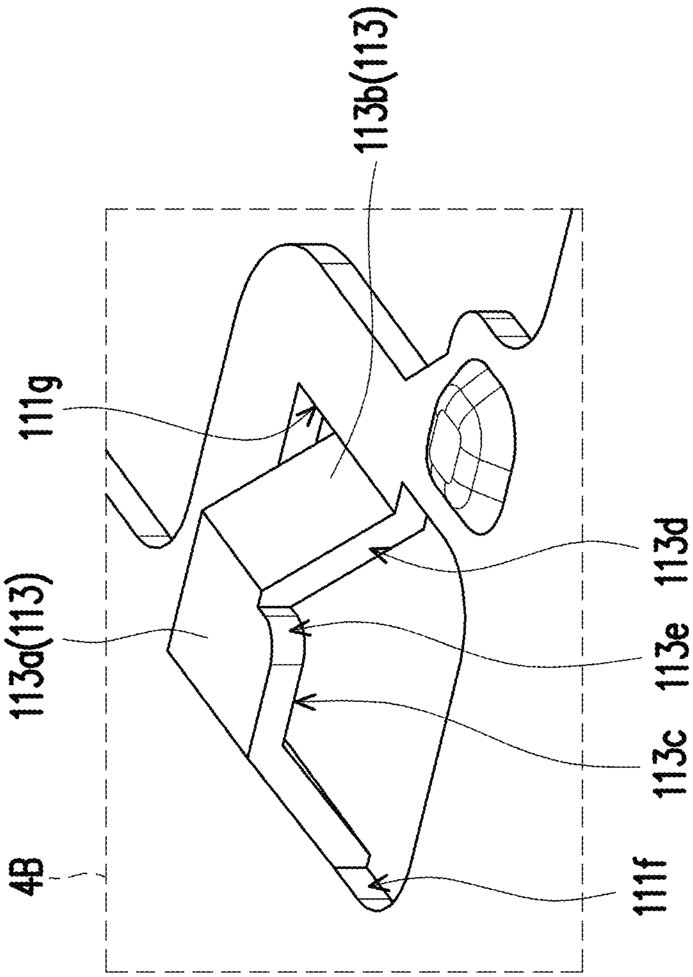
FIG. 4B is an enlarged schematic view of the area designated as 4B in FIG. 4A.

FIG. 3A is a schematic diagram of a carrier according to the first embodiment of the disclosure. FIG. 3B is an enlarged schematic view of the area designated as 3B in FIG. 3A. FIG. 4A is a schematic diagram that illustrates a different perspective of the view shown in 3A. FIG. 4B is an enlarged schematic view of the area designated as 4B in FIG. 4A. Referring to FIG. 2A to FIG. 4B, according to this embodiment, the carrier 110 includes a carrier body 111, two first positioning hooks 112 and two second positioning hooks 113. The keycap 120 is disposed above the carrier body 111, and the lifting member 130 is disposed between the carrier body 111 and the keycap 120. The elastic member 140 is disposed between the carrier body 111 and the keycap 120. The thin film circuit 150 is disposed on the carrier body 111, and the top and bottom ends of the elastic member 140 contact the keycap 120 and the thin film circuit 150 respectively.

The two first positioning hooks 112 are symmetrically disposed and protrude from the carrier body 111. The two second positioning hooks 113 are symmetrically disposed and protrude from the carrier body 111. One end of the lifting member 130 is connected to the keycap 120, and another end of the lifting member 130 is connected to the positioning hooks (including the two first positioning hooks 112 and the two second positioning hooks 113). Further, the lifting member 130 includes a first lifting stand 131 and a second lifting stand 132 pivotally connected to each other. A first end 131*a* of the first lifting stand 131 is connected to the keycap 120, and a second end 131*b* of the first lifting stand 131 is connected to the two first positioning hooks 112. On the other hand, a first end 132*a* of the second lifting stand 132 is connected to the keycap 120, and a second end 132*b* of the second lifting stand 132 is connected to the two second positioning hooks 113.

Each of the first positioning hooks 112 includes a first positioning portion 112*a* and a second positioning portion 112*b* connected to each other. A bottom surface 112*c* of the first positioning portion 112*a* serves as a stop surface of the second end 131*b* of the first lifting stand 131 in a first direction D1 (e.g., vertical direction), and the second end 131*b* of the first lifting stand 131 contacts the bottom surface 112*c* of the first positioning portion 112*a*. In addition, a side surface 112*d* of the second positioning portion 112*b* serves as a stop surface of the second end 131*b* of the first lifting stand 131 in a second direction D2 (e.g., horizontal direction), and the second end 131*b* of the first lifting stand 131 contacts the side surface 112*d* of the second positioning portion 112*b*. The second end 131*b* of the first lifting stand 131 is rotatably or slidably engaged with the first positioning hook 112 to rotate or slide relative to the carrier 110 within a defined range or stroke without disengaging from the carrier 110.

Each of the second positioning hooks 113 includes a first positioning portion 113*a* and a second positioning portion 113*b* connected to each other. A bottom surface 113*c* of the first positioning portion 113*a* serves as a stop surface of the second end 132*b* of the second lifting stand 132 in the first direction D1 (e.g., vertical direction), and the second end 132*b* of the second lifting stand 132 contacts the bottom surface 113*c* of the first positioning portion 113*a*. In addition, a side surface 113*d* of the second positioning portion 113*b* serves as a stop surface of the second end 132*b* of the second lifting stand 132 in the second direction D2 (e.g., horizontal direction), and the second end 132*b* of the second lifting stand 132 contacts the side surface 113*d* of the second positioning portion 113*b*. The second end 132*b* of the second lifting stand 132 is rotatably or slidably engaged with the second positioning hook 113 to rotate or slide relative to the carrier 110 within a defined range or stroke without disengaging from the carrier 110.

Referring to FIG. 3A to FIG. 4B, the carrier body 111 has two first vias 111*a*, two second vias 111*b* and multiple other vias 111*c*. The two first vias 111*a* are symmetrically disposed, and the two first positioning hooks 112 are respectively disposed corresponding to the two first vias 111*a*. In addition, the two second vias 111*b* are symmetrically disposed, and the two second positioning hooks 113 are respectively disposed corresponding to the two second vias 111*b*. Further, each of the first positioning hooks 112 spans the corresponding first via 111*a*, and each of the second positioning hooks 113 spans the corresponding second via 111*b*. That is, orthographic projection of each of the first positioning hooks 112 falls in the corresponding via 111*a*, and orthographic projection of each of the second positioning hooks 113 falls in the corresponding second via 111*b*.

Structures of each of the first positioning hooks 112 and each of the second positioning hooks 113 are the same or similar. The bottom surface 112*c* of the first positioning portion 112*a* of each of the first positioning hooks 112 faces the corresponding first via 111*a*, and the bottom surface 113*c* of the first positioning portion 113*a* of each of the second positioning hooks 113 faces the corresponding second via 111*b*. In addition, the side surface 112*d* of the second positioning portion 112*b* of each of the first positioning hooks 112 faces away from the side surface 113*d* of the second positioning portion 113*b* of each of the second positioning hooks 113.

As shown in FIG. 3A and FIG. 3B, the first positioning portion 112*a* and the second positioning portion 112*b* of each of the first positioning hooks 112 are respectively connected to two inner wall surfaces 111*d* and 111*e* opposite to each other in the corresponding first via 111*a*. As shown in FIG. 4A and FIG. 4B, the first positioning portion 113*a* and the second positioning portion 113*b* of each of the second positioning hooks 113 are respectively connected to two inner wall surfaces 111*f* and 111g opposite to each other in the corresponding second via 111*b*. As shown in FIG. 3A to FIG. 4B, the two first positioning hooks 112 and the two second positioning hooks 113 are formed on the carrier body 111 by drawing technology, which have a high structural strength. In addition, each of the first positioning hooks 112 and each of the second positioning hooks 113 has two connections with the carrier body 111, which have a high connection strength. Therefore, the two first positioning hooks 112 and the two second positioning hooks 113 are not easily broken or cracked with the carrier body 111 by the pulling of the lifting member 130 during the repeated lifting and lowering of the lifting member 130, thus improving reliability of operation.

As shown in FIG. 3A to FIG. 4B, the first positioning portion 112*a* of each of the first positioning hooks 112 is partially protruding relative to the side surface 112*d* of the second positioning portion 112*b* to form a notch 112*e*, which falls substantially on top of the first positioning hook 112. Similarly, the first positioning portion 113*a* of each of the second positioning hooks 113 is partially protruding relative to the side surface 113*d* of the second positioning portion 113*b* to form a notch 113*e*, which falls substantially on top of the second positioning hook 113. During the repeated lifting and lowering of the lifting member 130, the second end 131*b* of the first lifting stand 131 slides or rotates relative to the two first positioning hooks 112, and the design of the notch 112*e* on the top of each of the first positioning hooks 112 helps to improve the smoothness of the second end 131*b* as it slides or rotates. In addition, the second end 132*b* of the second lifting stand 132 slides or rotates relative to the two second positioning hooks 113, and the design of the notch 113*e* on the top of each of the second positioning hooks 113 helps to improve the smoothness of the second end 132*b* as it slides or rotates.

As shown in FIG. 2A to FIG. 2C, the thin film circuit 150 has multiple through holes 151 overlapping the vias (e.g., the first vias 111*a*, the second vias 111*b*, and the vias 111*c*), and the two first through positioning hooks 112 and the two second positioning hooks 113 penetrate the through holes 151.

Figure 5:
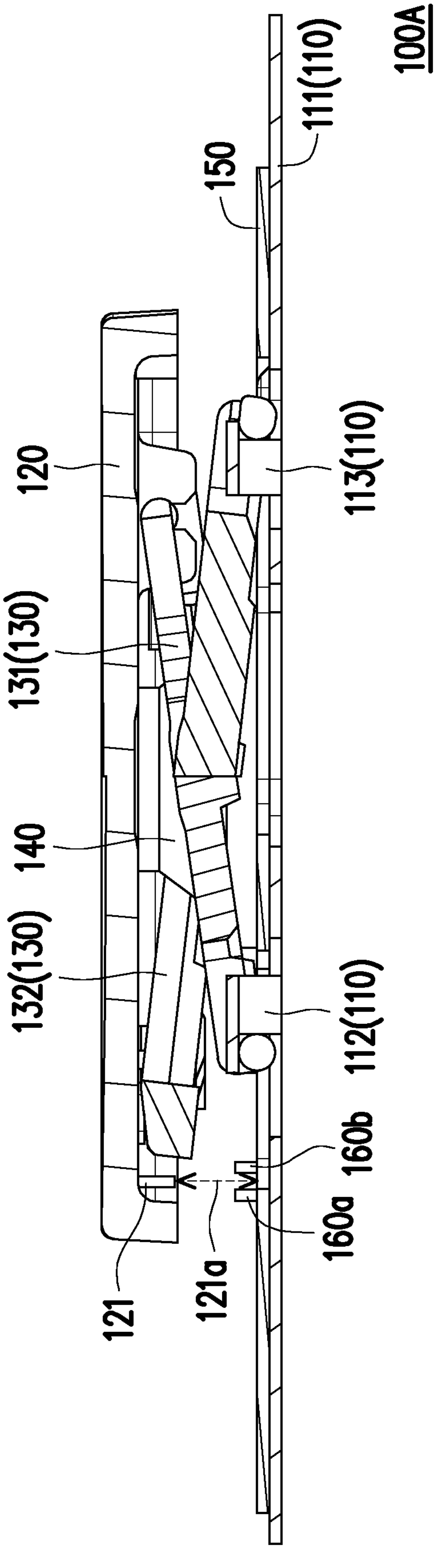
FIG. 5 is a schematic cross-sectional diagram of a key structure according to a second embodiment of the disclosure.

FIG. 5 is a schematic cross-sectional diagram of a key structure according to a second embodiment of the disclosure. Referring to FIG. 5, the design of a key structure 100A according to this embodiment is substantially the same as that of the key structure 100 shown in FIG. 2A to FIG. 2C. The main difference is that according to this embodiment, the key structure 100A further includes an optical switch disposed on the thin film circuit 150. The optical switch includes an optical transmitter 160*a* and an optical receiver 160*b*, and the keycap 120 has a light blocking portion 121 protruding toward the carrier body 111. Specifically, the optical switch is located on a moving path 121*a* of the light blocking portion 121, or in other words, the moving path 121*a* of the light blocking portion 121 passes between the optical transmitter 160*a* and the optical receiver 160*b*. Therefore, when the keycap 120 is pressed and lowered (i.e., moved toward the carrier 110), the light blocking portion 121 moves toward the carrier 110 and blocks light transmitted from the optical transmitter 160*a* to the optical receiver 160*b*, so that the optical receiver 160*b* cannot receive the light from the optical transmitter 160*a* to generate a trigger signal.

Figure 6:
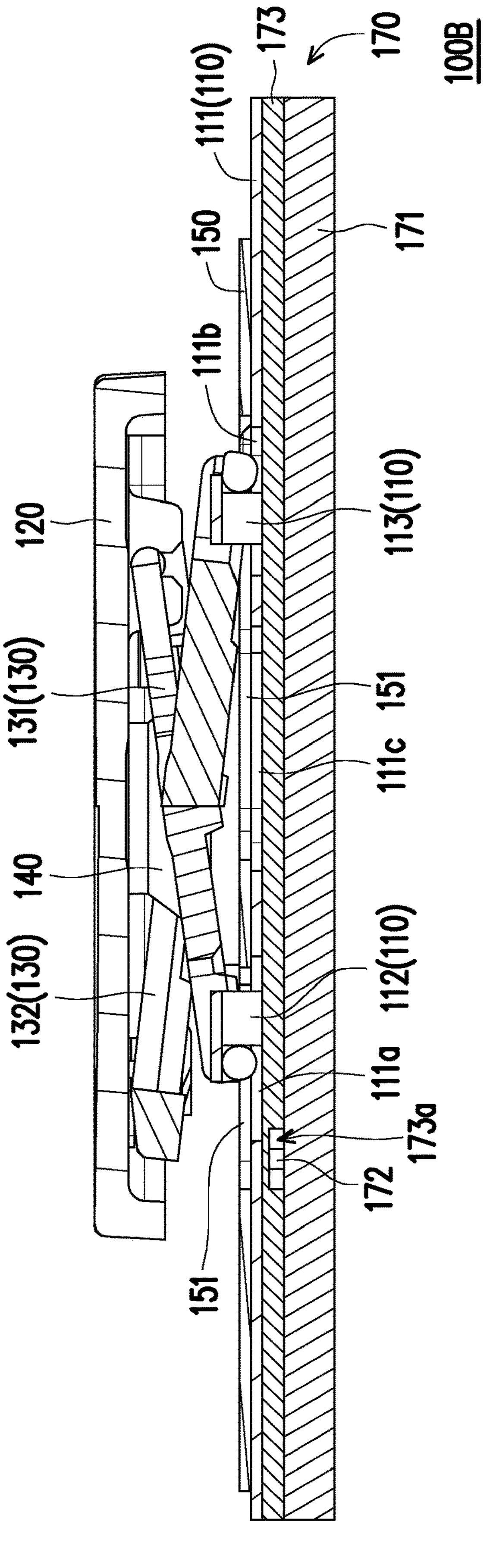
FIG. 6 is a schematic cross-sectional diagram of a key structure according to a third embodiment of the disclosure.

FIG. 6 is a schematic cross-sectional diagram of a key structure according to a third embodiment of the disclosure. Referring to FIG. 6, the design of a key structure 100B according to this embodiment is substantially the same as that of the key structure 100 shown in FIG. 2A to FIG. 2C. The main difference is that according to this embodiment, the key structure 100B further includes a backlight module 170. The carrier body 111 is disposed on the backlight module 170, and the backlight module 170 and the thin film circuit 150 are respectively disposed at two opposite sides of the carrier body 111. Specifically, light emitted by the backlight module 170 may be transmitted outwardly through the vias (e.g., the first vias 111*a*, the second vias 111*b*, and the vias 111*c*) and the through holes 151 to optimize the user's operating experience or visual perception. The backlight module 170 includes a circuit board 171, a light source 172, and a light guide plate 173. The light source 172 and the light guide plate 173 are disposed on the circuit board 171, and the light guide plate 173 is located between the carrier body 111 and the circuit board 171. The light guide plate 173 has a recess 173*a* for accommodating the light source 172, and light emitted by the light source 172 may be transmitted outward through the conduction of the light guide plate 173 to improve the uniformity of light output.

Figure 7:
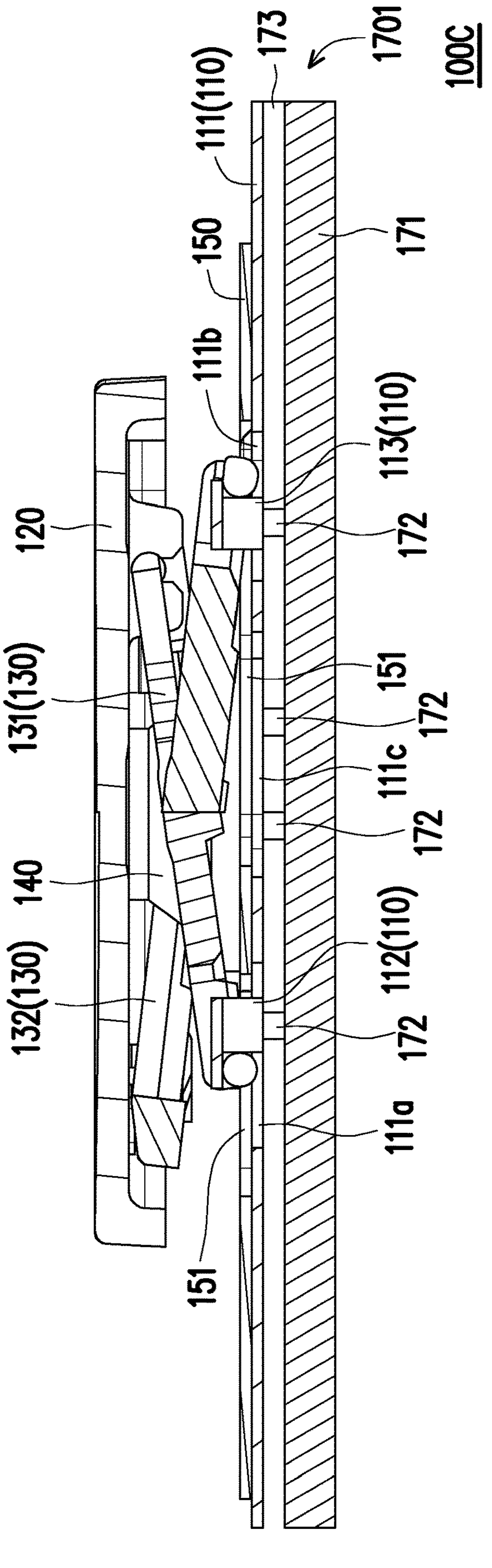
FIG. 7 is a schematic cross-sectional diagram of a key structure according to a fourth embodiment of the disclosure.

FIG. 7 is a schematic cross-sectional diagram of a key structure according to a fourth embodiment of the disclosure. Referring to FIG. 7, the design of a key structure 100C according to this embodiment is substantially the same as that of the key structure 100B shown in FIG. 6. The main difference is that according to this embodiment, a backlight module 1701 of the key structure 100C is not equipped with a light guide plate 173 (see FIG. 6), the light emitted by the light source 172 is directly transmitted outward through the vias (e.g., the first vias 111*a*, the second vias 111*b*, and the vias 111*c*) and the through holes 151 to increase the brightness of light output.

Figure 8A:
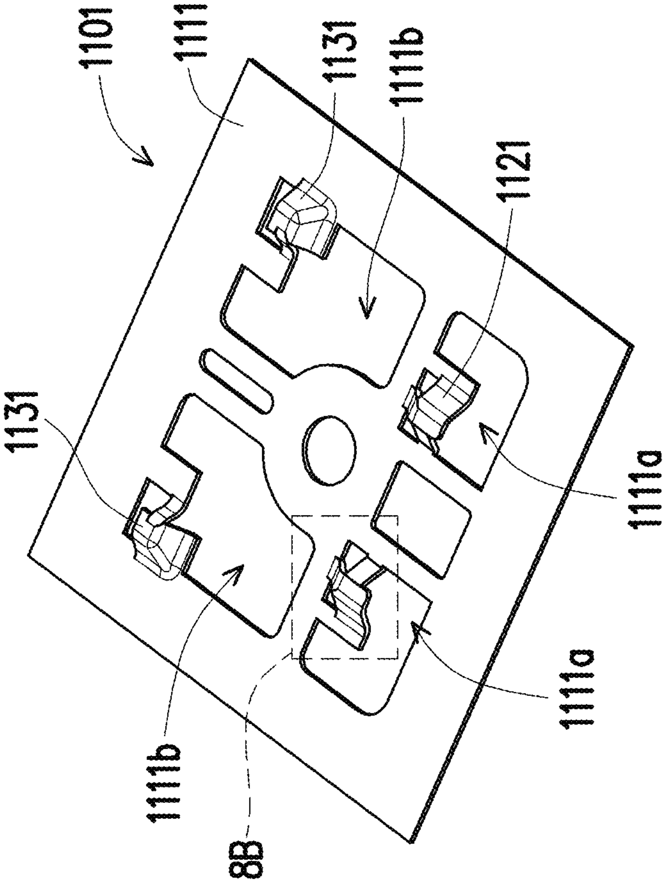
FIG. 8A is a schematic diagram of a carrier according to another embodiment of the disclosure.
Figure 8B:
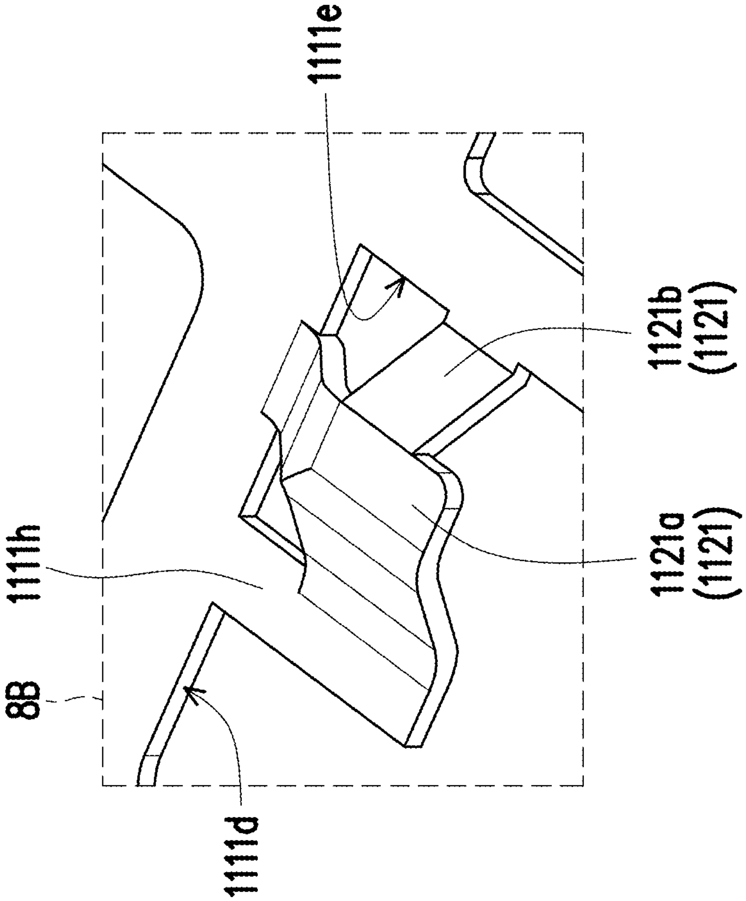
FIG. 8B is an enlarged schematic view of the area designated as 8B in FIG. 8A.
Figure 9A:
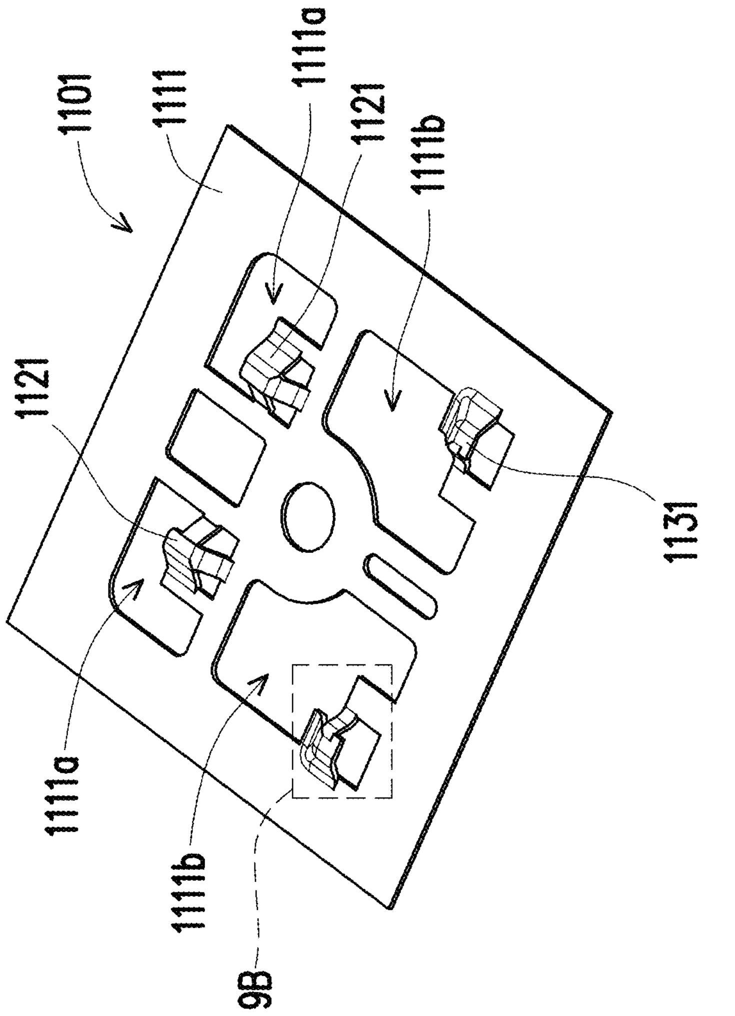
FIG. 9A is a schematic diagram that illustrates a different perspective of the view shown in 8A.
Figure 9B:
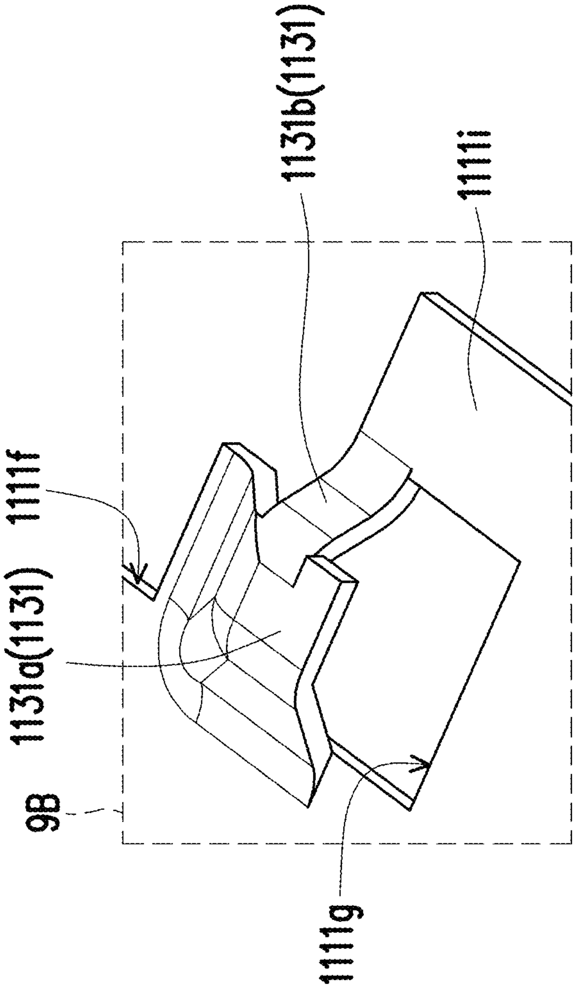
FIG. 9B is an enlarged schematic view of the area designated as 9B in FIG. 9A.

FIG. 8A is a schematic diagram of a carrier according to another embodiment of the disclosure. FIG. 8B is an enlarged schematic view of the area designated as 8B in FIG. 8A. FIG. 9A is a schematic diagram that illustrates a different perspective of the view shown in 8A. FIG. 9B is an enlarged schematic view of the area designated as 9B in FIG. 9A. Referring to FIG. 8A to FIG. 9B, the design principle of a carrier 1101 according to this embodiment is substantially the same as that of the carrier 110 shown in FIG. 3A to FIG. 4B. The main difference is that according to this embodiment, a first positioning portion 1121*a* and a second positioning portion 1121*b* of each of first positioning hooks 1121 are respectively connected to two inner wall surfaces 1111*d* and 1111*e* connected to each other in a corresponding first via 1111*a*, and a first positioning portion 1131*a* and a second positioning portion 1131*b* of each of second positioning hooks 1131 are respectively connected to two inner wall surfaces 1111*f* and 1111*g* connected to each other in a corresponding second via 1111*b*.

As shown in FIG. 8A and FIG. 8B, the inner wall surface 1111*d* of each of the first via 1111*a* is protruded with an extension support portion 1111*h*, and is connected to a bottom of the first positioning portion 1121*a* of the corresponding first positioning hook 1121. The first positioning portion 1121*a* of each of the first positioning hooks 1121 has two connections with the carrier body 1111, and the second positioning portion 1121*b* has one connection with the carrier body 1111. That is, the whole of each of the first positioning hooks 1121 has three connections with the carrier body 1111, which has a high connection strength.

As shown in FIG. 9A and FIG. 9B, the inner wall surface 1111*g* of each of the second via 1111*b* is protruded with an extension support portion 1111*i*, and is connected to a bottom of the second positioning portion 1131*b* of the corresponding second positioning hook 1131. Further, the second positioning portion 1131*b* of each of the second positioning hooks 1131 is not directly connected to the inner wall surface 1111*g* in the corresponding second via 1111*b*, but is connected to the inner wall surface 1111*g* in the corresponding second via 1111*b* through the extension support portion 1111*i*. That is, structures of each of the first positioning hooks 1121 and each of the second positioning hooks 1131 are slightly different.

To sum up, in the key structure of the disclosure, the positioning hooks are formed on the carrier body by drawing technology, which have a high structural strength. In addition, the positioning hooks and the carrier body have at least two connections, which have a high connection strength. Therefore, the positioning hooks are not easily broken or cracked with the carrier body by the pulling of the lifting member during the repeated lifting and lowering of the lifting member, thus improving reliability of operation.

It will be apparent to those skilled in the art that various modifications and variations can be made to the disclosed without departing from the scope or spirit of the disclosure. In view of the foregoing, it is intended that the disclosure covers modifications and variations provided that they fall within the scope of the following claims and their equivalents.

What is claimed is:

1. A key structure comprising:

a carrier comprising a carrier body and a plurality of positioning hooks protruding from the carrier body, wherein the carrier body has a plurality of vias, the plurality of positioning hooks are respectively disposed corresponding to the plurality of vias, an orthographic projection of each of the plurality of positioning hooks falls in the corresponding via, wherein the plurality of positioning hooks comprises a plurality of first positioning portions and a plurality of second positioning portions respectively connected to the plurality of first positioning portions, and each of the plurality of positioning hooks comprises one of the plurality of first positioning portions and one of the plurality of second positioning portions, and the first positioning portion and the second positioning portion of each of the plurality of positioning hooks are respectively connected to two inner wall surfaces opposite to each other in the corresponding via;

a keycap disposed above the carrier body;

a lifting member disposed between the carrier body and the keycap, wherein one end of the lifting member is connected to the keycap, and an other end of the lifting member is connected to the plurality of positioning hooks; and an elastic member disposed between the carrier body and the keycap, wherein the other end of the lifting member contacts a plurality of bottom surfaces of the plurality of first positioning portions and a plurality of side surfaces of the plurality of second positioning portions of the plurality of positioning hooks, and the plurality of first positioning portions are partially protruding relative to the plurality of side surfaces of the plurality of second positioning portions respectively to form a plurality of notches.

2. The key structure according to claim 1, wherein the lifting member comprises two lifting stands pivotally connected to each other, and each of the two lifting stands has a first end and a second end opposite to the first end, wherein the first end of each of the two lifting stands is connected to the keycap, the second end of each of the two lifting stands is connected to two of the plurality of positioning hooks, and the second end of each of the two lifting stands contacts two of the plurality of bottom surfaces of two of the plurality of first positioning portions and two of the plurality of side surfaces of two of the plurality of second positioning portions of two of the plurality of positioning hooks.

3. The key structure according to claim 1 further comprising:

a thin film circuit disposed on the carrier body, and located between the elastic member and the carrier body.

4. The key structure according to claim 3 further comprising:

an optical switch disposed on the thin film circuit, wherein the keycap has a light blocking portion protruding toward the carrier body, and the optical switch is located on a moving path of the light blocking portion.

5. The key structure according to claim 3, wherein the thin film circuit has a plurality of through holes overlapping the plurality of vias, and the plurality of positioning hooks penetrate the plurality of through holes.

6. The key structure according to claim 3 further comprising:

a backlight module and the thin film circuit respectively disposed at two opposite sides of the carrier body, and the thin film circuit having a plurality of through holes overlapping the plurality of vias.

7. The key structure according to claim 6, wherein the backlight module comprises a circuit board, a light source, and a light guide plate, wherein the light source and the light guide plate are disposed on the circuit board, the light guide plate has a recess for accommodating the light source, and the light guide plate is located between the carrier body and the circuit board.

8. The key structure according to claim 6, wherein the backlight module comprises a circuit board and a plurality of light sources, wherein the plurality of light sources are disposed on the circuit board.

* * * * *